Dec. 29, 1936.                    E. R. ALLING                    2,065,931
                                    CHAIN
                             Filed Aug. 24, 1934            2 Sheets-Sheet 1

INVENTOR
E. Roy Alling
By
ATTORNEY

Dec. 29, 1936.　　　　　E. R. ALLING　　　　　2,065,931
CHAIN
Filed Aug. 24, 1934　　　　2 Sheets-Sheet 2

INVENTOR
E. Roy Alling
By
ATTORNEY

Patented Dec. 29, 1936

2,065,931

UNITED STATES PATENT OFFICE 2,065,931

CHAIN

E. Roy Alling, Kenmore, N. Y.

Application August 24, 1934, Serial No. 741,288

13 Claims. (Cl. 198—189)

My invention relates in general to chains and more particularly to chains of the conveyor type.

It has been a principal object of my invention to provide a chain of this type, the links of which are so united that the chain shall be capable of flexing in a number of planes and also capable of a limited torsional movement.

A further object has been to provide a chain having links which may be readily assembled and disassembled, whereby repairs may be quickly and easily made.

Moreover, my invention is of such a nature that the links may be positively held down onto their track supporting means without interfering with the load-carrying surface thereof.

Furthermore, my chain is inexpensive to manufacture and very durable in operation.

The above objects and advantages have been accomplished by the device shown in the accompanying drawings, of which:

Figure 6:
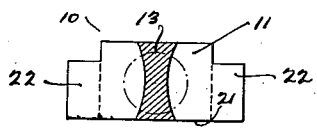
Fig. 6 is a sectional view, taken on line 6—6 of Fig. 5.
Figure 5:
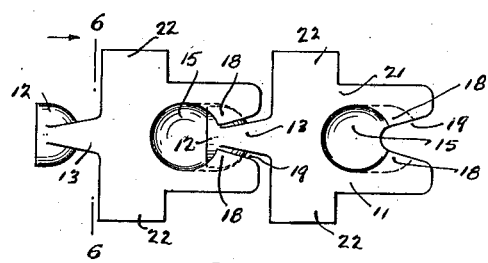
Fig. 5 is a bottom plan view of two of the assembled links of my chain.
Figure 2:
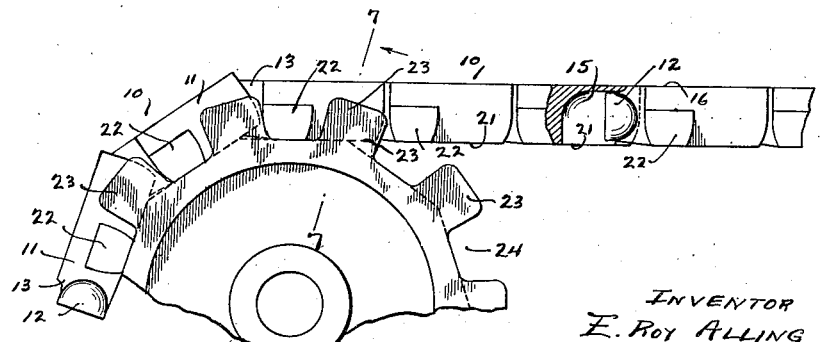
Fig. 2 is a fragmentary, side elevation of my chain engaged with a sprocket wheel.

My chain is formed of a plurality of links 10 each having a body portion 11. At one end of the body portion there is provided a ball member 12, substantially semi-spherical in form, and attached to the body member 11 by means of a neck 13. This neck is relatively thin and has concave side surfaces, as clearly shown in Fig. 6, whereby adjacent links may have a greater amount of lateral movement. The body is formed with a spherical recess 15 formed from its under side and extending to a point near the top working surface of the link 16 but not through such surface. Such recess is extended toward the end of the body opposite to the ball member 12 and it terminates in concave surfaces 17 which are formed partly by over-hanging lips 18 and which are designed to coact with the ball member 12 of an engaging link. This end of the body portion of the link is provided with a V-shaped slot 19 in which the neck 13 of an adjacent link engages. The slot 19 is considerably wider than the neck 13 so as to provide for lateral movement of adjacent links as well as relative torsional movement thereof. The length of the neck 13 is such that when the ball member 12 is in engagement with the concave surfaces 17 of an adjacent link, the body parts 11 of such adjacent links will be separated somewhat so as to provide for the relative flexing of the links. The spherically-shaped recess 15 opens into the bottom surface 21 of the link and, when the links are to be assembled, the ball member of an adjacent link is passed into the recess from the bottom surface of the link and is then brought into engagement with the concave surfaces 17 thereof.

The overhanging lips 18, forming terminations of the concave surfaces 17 are so proportioned in relation to the length of the neck that the body parts of adjacent links will contact with each other before the ball member 12 can become disengaged from the lips 18. By such arrangement the links will be kept in engagement when the chain is travelling in either direction. Easy assembling of the links can be accomplished by relatively rotating the links slightly in the plane of travel. As shown in the drawings, the upper surface of the neck 13, is made flush with the top surface of the body part 16 and this neck extends into the V-shaped slot 19. By this arrangement the neck bridges the space formed by the V-shaped opening so that the neck can not catch on objects being conveyed.

Each of the links 10 has a sprocket engaging lug 22 extending from each side of the body 11 thereof and arranged preferably at the end which carries the ball member. These lugs may have curved side faces so as to engage the teeth 23 of the sprocket wheel 24. This sprocket wheel is of a special type having a centrally arranged recess 25 for the reception of the chain and two sets of sprocket teeth 23, one arranged at each side of the recess, whereby the chain is driven from both sides by the engagement of the sprocket teeth 23 with the lugs 22 of the links.

The tooth engaging lugs 22 at each side of the body 11 of the links of my chain not only provide means for propelling the chain but also act as retaining lugs. When, for instance, the chain is being carried in a substantially horizontal plane around a corner or return bend upon a guide wheel 30, as shown diagrammatically in Fig. 8, these lugs which are on the inside curve of the chain engage with an over-hanging, annular lip 32 provided on the wheel, and thus keep the chain in place upon the wheel. The guide wheel is provided with a chain supporting flange 33 for the reception and support of the chain as it is being moved around upon the wheel. A stationary guide 34 may also be provided for engagement with lugs on the outside curve of the chain and this guide is preferably carried by the framework 35 of the conveyor table or support. This guide is preferably arcuate in form having its free edge extending over the lugs 22 on the outside curve of the chain on the wheel. This stationary guide serves to retain the chain in position and prevent it from being raised up off of the supporting platform 33 of the wheel (see Fig. 9). In cases where no guide wheel is employed, it is obvious that a stationary guide (not shown) may also be used on the inside curve of the chain, being of a design similar to the guide 34 except that the free edge would be convex instead of concave.

Figure 10:
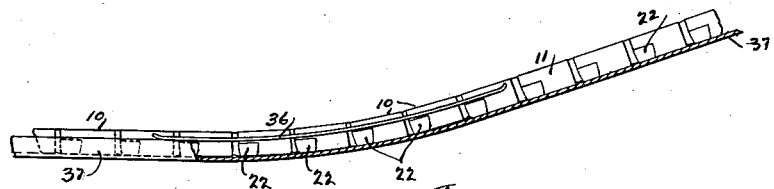
Fig. 10 is a fragmentary, side, sectional elevation of a portion of my chain used on an inclined track.

When my chain travels over an inclined track 37, as shown in Fig. 10, a curved guide 36 may be used at each side of the chain for engaging the top surfaces of the lugs 22. This guide may be carried at each side by the track, as shown. Such an arrangement prevents the chain from becoming disengaged from the track, which otherwise would occur when the chain is being operated and is thereby drawn taut.

Figure 1:
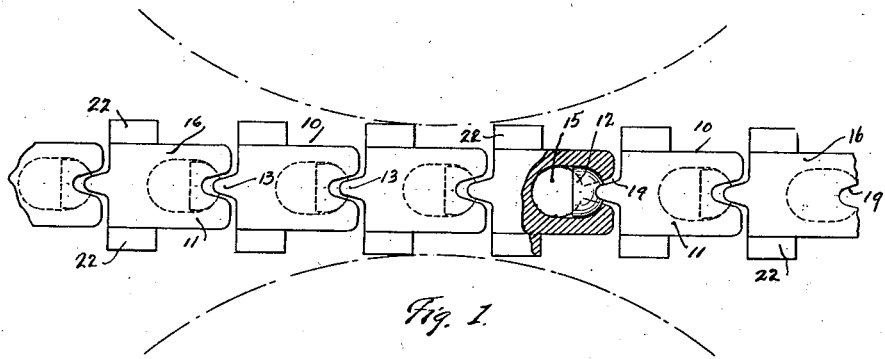
Fig. 1 is a plan view of a portion of my chain showing one of the links partly in section.
Figure 3:
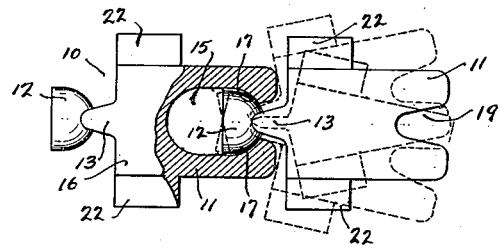
Fig. 3 is an enlarged plan view, partly in section, of two of the links of my chain showing the flexing thereof in lateral directions.
Figure 4:
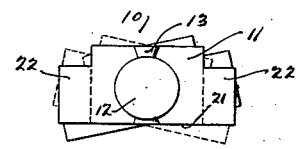
Fig. 4 is an end elevation of the chain showing the possible torsional displacement of the links.

From the foregoing, and particularly Fig. 3, it will be obvious that my chain can be flexed laterally in a plane parallel to the line of travel of the chain and therefore is capable of being bent around angular or return bends in either direction as shown by the dot-and-dash curved lines of Fig. 1. Furthermore, it is capable of being twisted as clearly shown in Fig. 4.

Figure 8:
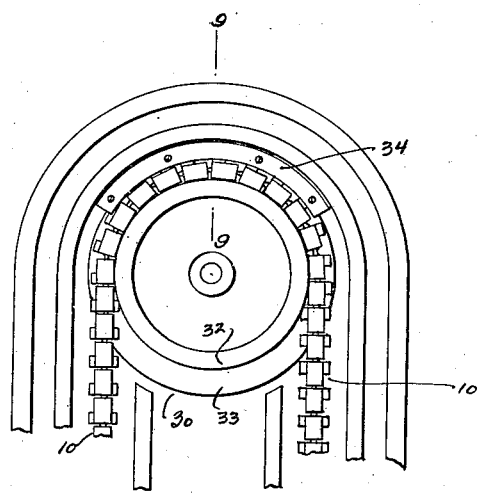
Fig. 8 is a fragmentary plan view of a portion of a conveyor table showing the wheel guide usually arranged at the curve or return bend in such table, and showing my chain used in connection therewith.
Figure 9:
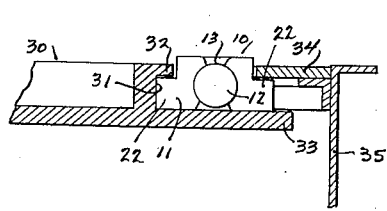
Fig. 9 is an enlarged, fragmentary, sectional view of Fig. 8 and taken on line 9—9 thereof.
Figure 7:
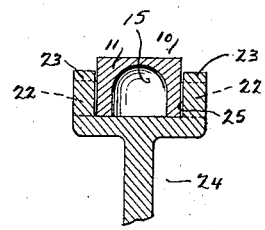
Fig. 7 is a cross-sectional view of the sprocket wheel of Fig. 2, and is taken on line 7—7 of Fig. 2.

By providing the sprocket engaging lugs 22 at each side of the link body 11, and by having the tops of such lugs arranged below the top working surface 16 of the links, the chain can be guided as described in connection with the return bend of Fig. 8 or the inclined pass of Fig. 10 without interfering with the action of the working surface. This is particularly of great advantage when the chain is used to convey objects up a rather steep incline and when projections are used on some of the links to prevent slippage of the articles being conveyed.

Obviously, some modifications of the details herein shown and described may be made without departing from the spirit of my invention or the scope of the appended claims, the form shown being merely a preferred embodiment thereof.

Having thus described my invention, what I claim is:

1. A chain comprising a plurality of links, each link having a solid body part, a substantially semi-spherical ball member at one end of said body part, a neck connecting said ball member with said body part, said body part being formed with a spherically-shaped recess in the end opposite the ball member for the reception of the ball member of an adjacent link, said recess being terminated in overhanging lips, and a sprocket engaging lug carried by the body and arranged one at each side thereof, the length of the neck and overhanging lips being so portioned that the body parts of adjacent links will contact before the ball member of one link can become disengaged from the recess of the adjacent link under normal working conditions.

2. A chain comprising a plurality of identical links, each link having a solid body part, a substantially semi-spherical ball member at one end of said body part, a neck connecting said ball member with said body part, the body and neck of each of said links having a supporting surface, said surfaces on adjacent links being so formed that they provide a continuous, straight-line, flat supporting surface when the chain is in a horizontal plane, said body part being formed with a semi-spherical recess in the end opposite to the ball member for the reception of the ball member of an engaging link, sprocket engaging lugs carried by the body and arranged one at each side thereof, the top surfaces of said lugs being arranged some distance below the load carrying surface of the link, and said body being also formed with a V-shaped slot extending from the semi-spherical recess and opening into the end of the body for the reception of the neck of an adjacent link.

3. A conveyor comprising a chain formed from a plurality of identical links, each link having a solid body part, a substantially semi-spherical ball member at one end of said body part, a neck connecting said ball member with said body part, the body and neck of each of said links having a supporting surface, said surfaces on adjacent links being so formed that they provide a continuous, straight-line, flat supporting surface when the chain is in a horizontal plane, said body part being formed with a semi-spherical recess in the end opposite to the ball member for the reception of the ball member of an engaging link, sprocket engaging lugs carried by the body and arranged one at each side thereof, the top surfaces of said lugs being arranged some distance below the load carrying surface of the link, means for guiding the chain around a curve in a substantially horizontal plane, and a stationary guide arranged to engage the lugs at the outside curve formed by the chain.

4. A conveyor system comprising a sprocket wheel having two interspaced series of teeth, and a conveyor chain, said chain comprising load supporting links, each link being formed with a solid body part having a substantially smooth load supporting surface, a substantially semi-spherical ball member at one end of the body part, a neck connecting said ball member with said body part, said body part being formed with a semi-spherical recess in the end opposite the ball member for the reception of the ball member of an adjacent link, said recess being terminated in overhanging lips, the length of the neck and the overhanging lips being so proportioned that the body parts of adjacent links will contact before the ball member of one link can become disengaged from the recess of the adjacent link under normal working conditions, a sprocket engaging lug carried by each side of the body and engageable with the teeth of the sprocket for driving the chain, and a guide wheel for guiding the chain around a curved bend in the same plane as that occupied by the wheel, said wheel being formed with an annular recess for engagement with the lugs carried by the link on the inside of the curved chain.

5. A conveyor system comprising a sprocket wheel having two interspaced series of teeth, and a conveyor chain, said chain comprising load supporting links, each link being formed with a solid body part having a substantially smooth load supporting surface, a substantially semi-spherical ball member at one end of the body part, a neck connecting said ball member with said body part, said body part being formed with a semi-spherical recess in the end opposite the ball member for the reception of the ball member of an adjacent link, said recess being terminated in overhanging lips, the length of the neck and the overhanging lips being so proportioned that the body parts of adjacent links will contact before the ball member of one link can become disengaged from the recess of the adjacent link under normal working conditions, a sprocket engaging lug carried by each side of the body and engageable with the teeth of the sprocket for driving the chain, a guide wheel for guiding the chain around a curved bend in the same plane as that occupied by the wheel, said wheel being formed with an annular recess for engagement with the lugs carried by the link on the inside of the curved chain, and a stationary guide for engagement with the lugs on the outside curve of the chain.

6. A conveyor system comprising a sprocket wheel having two interspaced series of teeth, and a conveyor chain, said chain comprising load supporting links, each link being formed with a solid body part having a substantially smooth load supporting surface, a substantially semi-spherical ball member at one end of the body part, a neck connecting said ball member with said body part, said body part being formed with a semi-spherical recess in the end opposite the ball member for the reception of the ball member of an adjacent link, said recess being terminated in overhanging lips, the length of the neck and the overhanging lips being so proportioned that the body parts of adjacent links will contact before the ball member of one link can become disengaged from the recess of the adjacent link under normal working conditions, a sprocket engaging lug carried by each side of the body and engageable with the teeth of the sprocket for driving the chain, a track for the chain, and stationary guiding means engageable with the lugs on each side of the link blank, whereby the chain will be kept within the track when it is being moved over an inclined plane.

7. A conveyor system comprising a sprocket wheel having two interspaced series of teeth, and a conveyor chain, said chain comprising load supporting links, each link being formed with a solid body part having a substantially smooth load supporting surface, a substantially semi-spherical ball member at one end of the body part, a neck connecting said ball member with said body part, said body part being formed with a semi-spherical recess in the end opposite the ball member for the reception of the ball member of an adjacent link, said recess being terminated in overhanging lips, the length of the neck and the overhanging lips being so proportioned that the body parts of adjacent links will contact before the ball member of one link can become disengaged from the recess of the adjacent link under normal working conditions, a sprocket engaging lug carried by each side of the body and engageable with the teeth of the sprocket for driving the chain, a guide wheel for guiding the chain around a curved bend in the same plane as that occupied by the wheel, said wheel being formed with an annular recess for engagement with the lugs carried by the link on the inside of the curved chain, a track for the chain, and stationary guiding means engageable with the lugs on each side of the link blank, whereby the chain will be kept within the track when it is being moved over an inclined plane.

8. A chain comprising a plurality of identical links, each link having a body part, a substantially semi-spherical ball member at one end of said body part, a neck connecting said ball member with said body part, the body and neck of each of said links having a supporting surface, said surfaces on adjacent links being so formed that they provide a continuous, straight-line, flat supporting surface when the chain is in a horizontal plane, said body part being formed with a semi-spherical recess in the end opposite to the ball member for the reception of the ball member of an engaging link, lugs carried by the body and arranged one at each side thereof, and the top surfaces of said lugs being arranged some distance below the load carrying surface of the link, said body being also formed with a slot extending from the semi-spherical recess and opening into the end of the body for the reception of the neck of an adjacent link.

9. A conveyor comprising a chain formed from a plurality of identical links, each link having a body part, a substantially semi-spherical ball member at one end of said body part, a neck connecting said ball member with said body part, the body and neck of each of said links having a supporting surface, said surfaces on adjacent links being so formed that they provide a continuous, straight-line, flat supporting surface when the chain is in a horizontal plane, said body part being formed with a semi-spherical recess in the end opposite to the ball member for the reception of the ball member of an engaging link, lugs carried by the body and arranged one at each side thereof, the top surfaces of said lugs being arranged some distance below the load carrying surface of the link, means for guiding the chain around a curve in a substantially horizontal plane, and a stationary guide arranged to engage the lugs at the outside curve formed by the chain.

10. A conveyor system comprising a sprocket wheel having two interspaced series of teeth, and a conveyor chain, said chain comprising load supporting links, each link being formed with a body part having a substantially smooth load supporting surface, a substantially semi-spherical ball member at one end of the body part, a neck connecting said ball member with said body part, said body part being formed with a semi-spherical recess in the end opposite the ball member for the reception of the ball member of an adjacent link, said recess being terminated in overhanging lips, the length of the neck and the overhanging lips being so proportioned that the body parts of adjacent links will contact before the ball member of one link can become disengaged from the recess of the adjacent link under normal working conditions, a sprocket engaging lug carried by each side of the body and engageable with the teeth of the sprocket for driving the chain, and a guide wheel for guiding the chain around a curved bend in the same plane as that occupied by the wheel.

11. A conveyor system comprising a sprocket wheel having two interspaced series of teeth, and a conveyor chain, said chain comprising load supporting links, each link being formed with a body part having a substantially smooth load supporting surface, a substantially semi-spherical ball member at one end of the body part, a neck connecting said ball member with said body part, said body part being formed with a semi-spherical recess in the end opposite the ball member for the reception of the ball member of an adjacent link, said recess being terminated in overhanging lips, the length of the neck and the overhanging lips being so proportioned that the body parts of adjacent links will contact before the ball member of one link can become disengaged from the recess of the adjacent link under normal working conditions, a sprocket engaging lug carried by each side of the body and engageable with the teeth of the sprocket for driving the chain, a guide wheel for guiding the chain around a curved bend in the same plane as that occupied by the wheel, and a stationary guide for engagement with the lugs on the outside curve of the chain.

12. A chain comprising a plurality of links, each link having a body part, a substantially semi-spherical ball member at one end of said body part, a neck connecting said ball member with said body part, said body part being formed with a spherically-shaped recess in the end opposite the ball member for the reception of the ball member of an adjacent link, said recess being terminated in overhanging lips, and a lug carried by the body and arranged one at each side thereof, the length of the neck and overhanging lips being so proportioned that the body parts of adjacent links will contact before the ball member of one link can become disengaged from the recess of the adjacent link under normal working conditions.

13. A conveyor system comprising a sprocket wheel having two interspaced series of teeth, and a conveyor chain, said chain comprising load supporting links, each link being formed with a body part having a substantially smooth load supporting surface, a substantially semi-spherical ball member at one end of the body part, a neck connecting said ball member with said body part, said body part being formed with a semi-spherical recess in the end opposite the ball member for the reception of the ball member of an adjacent link, said recess being terminated in overhanging lips, the length of the neck and the overhanging lips being so proportioned that the body parts of adjacent links will contact before the ball member of one link can become disengaged from the recess of the adjacent link under normal working conditions, and a sprocket engaging lug carried by each side of the body and engageable with the teeth of the sprocket for driving the chain.

E. ROY ALLING.